US006717792B2

(12) United States Patent
Gorczyca et al.

(10) Patent No.: US 6,717,792 B2
(45) Date of Patent: Apr. 6, 2004

(54) EMITTER ASSEMBLY

(75) Inventors: John Gorczyca, Lansdale, PA (US); Michael Jacobs, Lansdale, PA (US); King K. Miller, Philadelphia, PA (US)

(73) Assignee: Illinois Tool Works Inc., Glenview, IL (US)

( * ) Notice: Subject to any disclaimer, the term of this patent is extended or adjusted under 35 U.S.C. 154(b) by 286 days.

(21) Appl. No.: 09/896,950

(22) Filed: Jul. 3, 2001

(65) Prior Publication Data

US 2002/0071235 A1 Jun. 13, 2002

Related U.S. Application Data

(60) Provisional application No. 60/254,206, filed on Dec. 8, 2000.

(51) Int. Cl.[7] .................................................. H02H 1/00

(52) U.S. Cl. ........................ 361/212; 361/220; 361/230

(58) Field of Search ................................ 361/212, 220, 361/229, 230, 231

(56) References Cited

U.S. PATENT DOCUMENTS

| | | | | |
|---|---|---|---|---|
| 4,363,072 A | * | 12/1982 | Coggins | 361/231 |
| 5,055,963 A | | 10/1991 | Partridge | 361/231 |
| 5,249,094 A | | 9/1993 | Hayakawa et al. | 361/229 |
| 5,508,880 A | | 4/1996 | Beyer | 361/230 |
| 5,795,131 A | * | 8/1998 | Crowhurst et al. | 416/146 R |
| 5,973,905 A | | 10/1999 | Shaw | 361/231 |
| 6,118,645 A | | 9/2000 | Partridge | 361/231 |
| 6,137,670 A | * | 10/2000 | West et al. | 361/213 |

FOREIGN PATENT DOCUMENTS

| | | |
|---|---|---|
| FR | 2 085 510 A | 12/1971 |
| GB | 1 305 382 A | 1/1973 |
| TW | 327982 | 3/1998 |
| TW | 392988 | 6/2000 |

OTHER PUBLICATIONS

European Search Report for EP Application No. 01128494.0, mail date: Feb. 21, 2002, 3 pages.

* cited by examiner

*Primary Examiner*—Stephen W. Jackson
(74) *Attorney, Agent, or Firm*—Akin Gump Strauss Hauer & Feld, LLP

(57) ABSTRACT

An apparatus that supports ionizing pins which extend radially outwardly from an annular assembly ring. The apparatus is preferably used as part of an ion air blower and is preferably contained inside of an ion air blower housing. Also enclosed in the ion air blower housing is a fan that is used to force air over the ionizing pins. The ionizing pins extend from the outer surface of the annular assembly ring with the ionizing pin tips positioned in an air guide proximate to the point of fastest airflow generated by the fan blades. This facilitates the stripping of ions from the ends of the ionizing pins by the propelled air. Additionally, the outwardly orientation of the ionizing pins naturally allows the ions to be directed outward towards the fastest airflow and allows for the increased miniaturization of an ion air blower using the emitter of the present invention.

21 Claims, 7 Drawing Sheets

EMITTER ASSEMBLY

CROSS-REFERENCE TO RELATED APPLICATIONS

This is application claims the benefit of U.S. Provisional Application No. 60/254,206 entitled "Emitter Assembly," filed Dec. 8, 2000.

BACKGROUND OF THE INVENTION

The present invention is directed to ion generators and, more specifically, to an emitter assembly having outwardly extending ionizing pins. These ion generators are related generally to the field of devices that neutralize static charges in workspaces to minimize the potential for electrostatic discharge.

In many manufacturing and processing environments, it is desirable to prevent the accumulation of charge within a workspace. To prevent the accumulation of charge both positive and negative ions are guided into the workspace to neutralize any charge which may be building up. One example of an industry in which the accumulation of charge in production areas must be avoided is the disk drive industry where it is critical to maintain high manufacturing yields.

FIG. 1 shows, an emitter assembly 10' of the type commonly used in ion air blowers. The emitter assembly 10' is mounted so that air is propelled or drawn through an air guide 30' which is formed by an annular ring 22'. Ionizing pins 32' extend generally radially inwardly from the annular ring 32' so that their tips are positioned in the air flow to allow ions to be blown or drawn off of the ionizing pins 32' and out of the ion air blower (not shown) which houses the emitter assembly 10'.

It is common to use a fan (not shown) to drive or draw the air through the air guide 30'. The diameter of the area swept out by the fan blades of the fan assembly is approximately equal to the inner diameter of the annular ring 22'. Due to the position of the tips of the ionizing pins 32' being proximate to the outer edge of the fan blades, the ions from the emitter assembly are released into a slower portion of the airflow generated by the fan.

Conventional emitter assemblies 10' use relatively complicated point to point wiring 26' to supply power to the ionizing pins 32'. The miniaturization of the ion air blower housing (not shown) which encloses the emitter assembly 10' is limited by the size of the air guide 30' of the emitter assembly 10'. Due to the high voltage being transferred through the wiring 26' to the ionizing pins 32', it is necessary that the housing of the ion air blower be spaced a minimum distance from the outside of the air guide 30' to prevent the arcing or other leakage of electricity from either the pins 32' or the wiring 26' to the ion air blower housing (metal housings are preferred for electrical shielding purposes).

The size of the annular ring 22' is also limited by the size of the fan to be used with the emitter assembly 10'. If the diameter of the annular ring 22' is smaller than the diameter of the fan, then the amount of air forced through the air guide 30' is reduced and the efficiency of the ion air blower is detrimentally effected.

The emitter assembly 10' requires relatively complicated molding, tooling, and assembly of the annular ring 22' to accommodate the wiring 26' and the mounting of the ionizing pins 32'. In order to properly mount the ionizing pins 32' on the annular ring 22', it is necessary to manufacture sockets (not shown) for receiving the ionizing pins 32' that are disposed within the body of the annular ring 22'. The tooling necessary to form the relatively complicated annular ring 22' as well as the complicated point to point wiring and size limitations associated with the emitter assembly 10' imposes several design limitations on devices using the emitter assembly 10'.

What is needed, but so far not provided by the conventional art, is an emitter assembly that is easy to manufacture, that allows an ion air blower incorporating the emitter assembly to be miniaturized without the risk of causing electrical arcs from the emitter assembly, that allows the ion air blower housing which encloses the emitter assembly to be miniaturized to a size comparable to that of the housing used by the fan of the ion air blower, and that facilitates the removal of ions from the ionizing pins by disposing the tips of the ionizing pins in the relatively faster portion of the airflow generated by the fan.

BRIEF SUMMARY OF THE INVENTION

The present invention is an emitter assembly having outwardly extending ionizing pins. The emitter assembly of the present invention supports ionizing pins that extend generally radially outwardly from an annular assembly ring. The prior art recognized the use of ionizing pins supported by a ring structure; however, the prior art did not recognize that pointing the pins inwardly would be a limiting factor for reducing the size of the assembly.

The emitter assembly of the present invention is preferably, but not necessarily, used as part of an ion air blower and is preferably contained inside of an ion air blower housing. Also enclosed in the ion air blower housing is a fan that is used to force air or draw air over the ionizing pins. The ionizing pins extend from the outer surface of the annular assembly ring with the ionizing pin tips positioned in the air guide proximate to the point of fastest airflow generated by the fan blades. This facilitates the stripping of ions from the ends of the ionizing pins by the propelled or drawn air. Additionally, the generally outwardly orientation of the ionizing pins allows for the increased miniaturization of an ion air blower using the emitter.

The emitter assembly of the present invention also allows for simplified manufacturing and assembly. Because of the geometry and reduced complexity of the layout, it facilitates the use of a relatively simple mold for the manufacture. Further, by not requiring the central portion of the assembly to be open, an embodiment of the present invention reduces the complexity of the wire routing. Another embodiment eliminates conventional wiring altogether by utilizing prefabricated connectors, which may be a printed circuit board, for joining the ionizing pins to a power supply.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
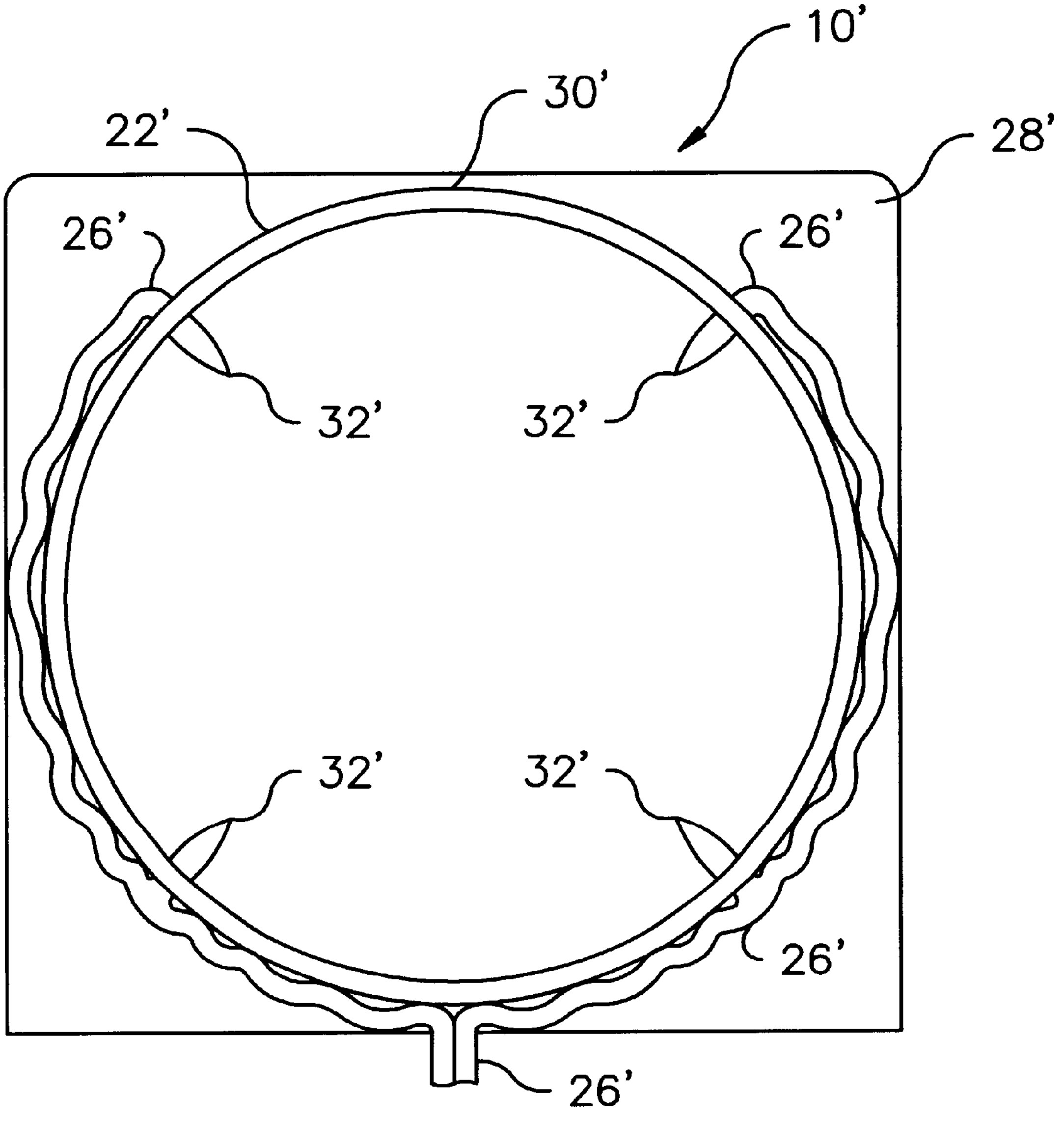
Fig. 1 (Prior Art)
FIG. 1 is a rear elevation view of a prior art emitter assembly.

I. Overview of Present Invention 2A, 2B, and 3 show an emitter assembly 10 in accordance with the present invention. The emitter assembly 10 comprises an annular assembly ring 34 and at least one ionizing pin 32 supported by and extending radially outward from the annular assembly ring 34 wherein the at least one pin 32 is used to generate at least one of either positive or negative ions (not shown) for neutralizing charge in a workspace (not shown).

The emitter assembly 10 may also comprise a plurality of ionizing pins 32 located about the annular assembly ring 34. The emitter assembly 10 may also comprise an annular assembly ring 34 that is generally cylindrical in shape. The emitter assembly 10 may also comprise an annular assembly ring 34 that is formed of a molded material such as acrylonitrile butadiene styrene ("ABS"), polyvinyl chloride ("PVC"), or polypropylene. The emitter assembly 10 may comprise ionizing pins 32 that are formed of machined tungsten.

The emitter assembly 10 may comprise a voltage power supply that is supplied with electrical power conditioned at between about seventy (70 V) and about two hundred forty (240 V) volts AC at between about fifty (50 Hz) and about sixty (60 Hz) hertz. The voltage power supply can include a circuit, such as a transformer, capable of stepping up the voltage to between about five thousand (5 KV) and ten thousand (10 KV) volts AC at between about fifty (50 Hz) and about sixty (60 Hz) hertz. Alternatively, the voltage power supply can include a circuit, such as a rectifier that includes a diode and capacitor arrangement, capable of increasing the voltage to between about five thousand (5 KV) and ten thousand (10 KV) volts DC of both positive and negative polarities. In yet another embodiment, the emitter assembly 10 may comprise a voltage power supply which is supplied with electrical power conditioned at about twenty-four (24 V) volts DC. The voltage power supply can include a circuit, such as a free standing oscillator which is used as an AC source to drive a transformer whose output is rectified, capable of conditioning the voltage to between about five thousand (5 KV) and ten thousand (10 KV) volts DC of both positive and negative polarities.

Figure 3:
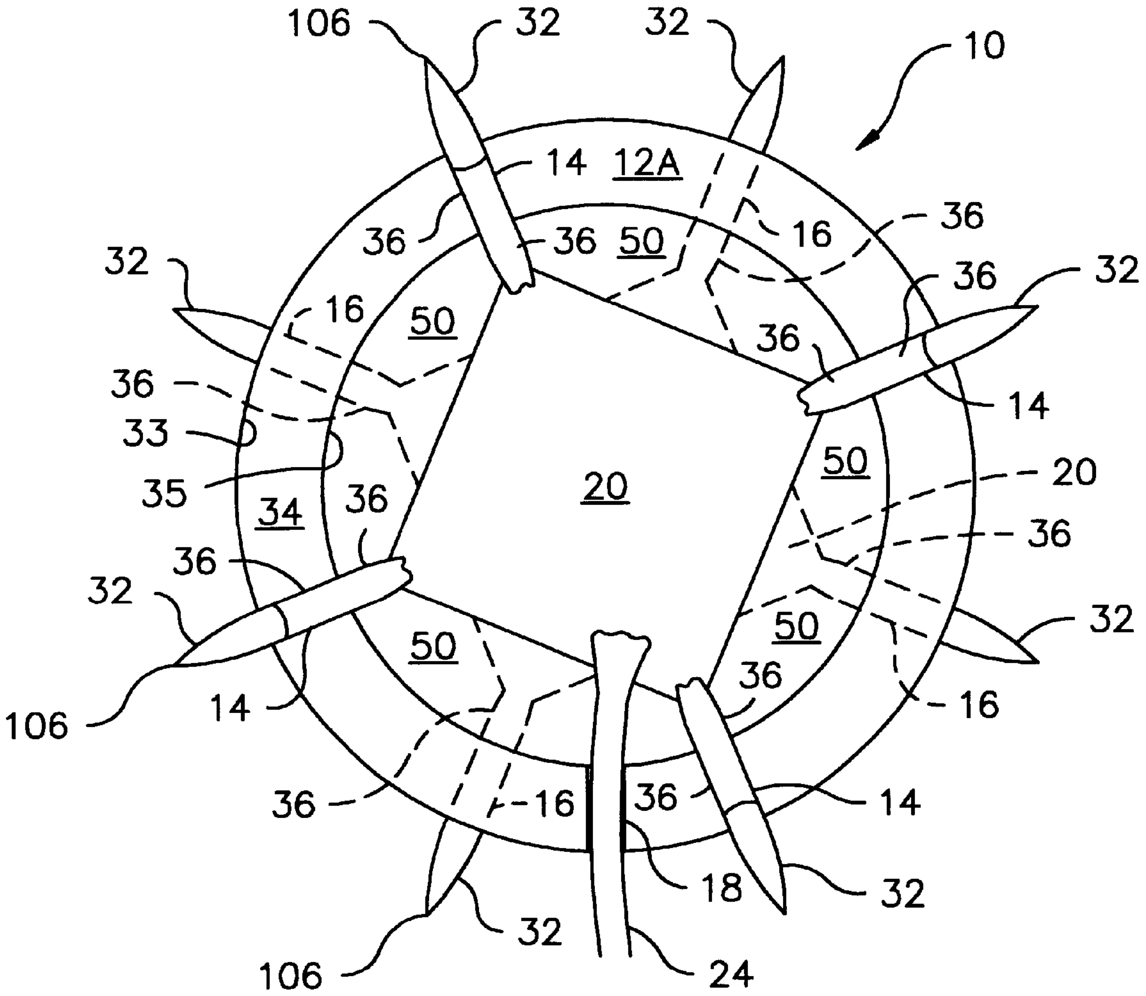
FIG. 3 is a rear elevation view of the emitter assembly of the present invention.

Referring more specifically to FIG. 3, the emitter assembly 10 may comprise at least one electrical connector 20 for powering the ionizing pins 32 disposed in the annular assembly ring 34 that has sockets 36 directly attached for receiving the ionizing pins 32 and that is supplied power via the power conduits 24. The emitter assembly 10 may comprise a single electrical connector 20 used in conjunction with AC voltage for generating both positive and negative ions (not shown). The emitter assembly 10 may also comprise two electrical connectors 20 used in conjunction with DC voltage that allows one set of pins 32 to be operated at a positive voltage and a second set of pins 32 to be operated at a negative voltage for generating positive and negative ions (not shown). The emitter assembly 10 may comprise an electrical connector 20 that is a printed circuit board (not shown) fabricated simplify wire routing The emitter assembly 10 may also comprise two electrical connectors 20 used to supply power to alternate sets of ionizing pins 32 that form a capacitor (not shown) which reduces the noise of the emitter assembly 10 and increases the output stability.

FIGS. 4 through 8 show various parts of an ion air blower 118 incorporating the current invention. The ion air blower 118 comprises an emitter assembly 10 and a housing 120 capable of guiding a flow of air 116. This emitter assembly 10 includes an annular assembly ring 34, and at least one ionizing pin 32 supported by and extending radially outward from the annular assembly ring 34. The ion air blower 118 may also comprise a fan 39 located upstream or downstream from the emitter assembly 10, relative to the flow of air 116 through the ion air blower 118.

II. Detailed Description

Certain terminology is used in the following detailed description for convenience only and is not limiting. The words "right," "left," "lower" and "upper" designate directions in the drawings to which reference is made. The words "inwardly" and "outwardly" refer to directions toward and away from, respectively, the geometric center of the emitter assembly 10 and designated parts thereof. The terminology includes the words above specifically mentioned, derivatives thereof and words of similar import. Additionally, the word "a," as used in the claims and in the corresponding portions of the specification means "at least one."

Referring to the drawings in detail, wherein like numerals represent like elements throughout, there is shown in FIGS. 2A–5 a preferred embodiment of an emitter assembly, generally designated as 10. Briefly speaking, referring to FIG. 3, the emitter assembly 10 of the present invention supports ionizing pins 32 that extend generally radially outwardly from an annular assembly ring 34. As further detailed below, the generally outwardly orientation of the ionizing pins 32 allows for the increased miniaturization of an ion air blower using the emitter assembly 10. Additionally, the structure of the annular assembly ring 34 is readily producible using a minimum amount of tooling and processing steps.

Figure 4:
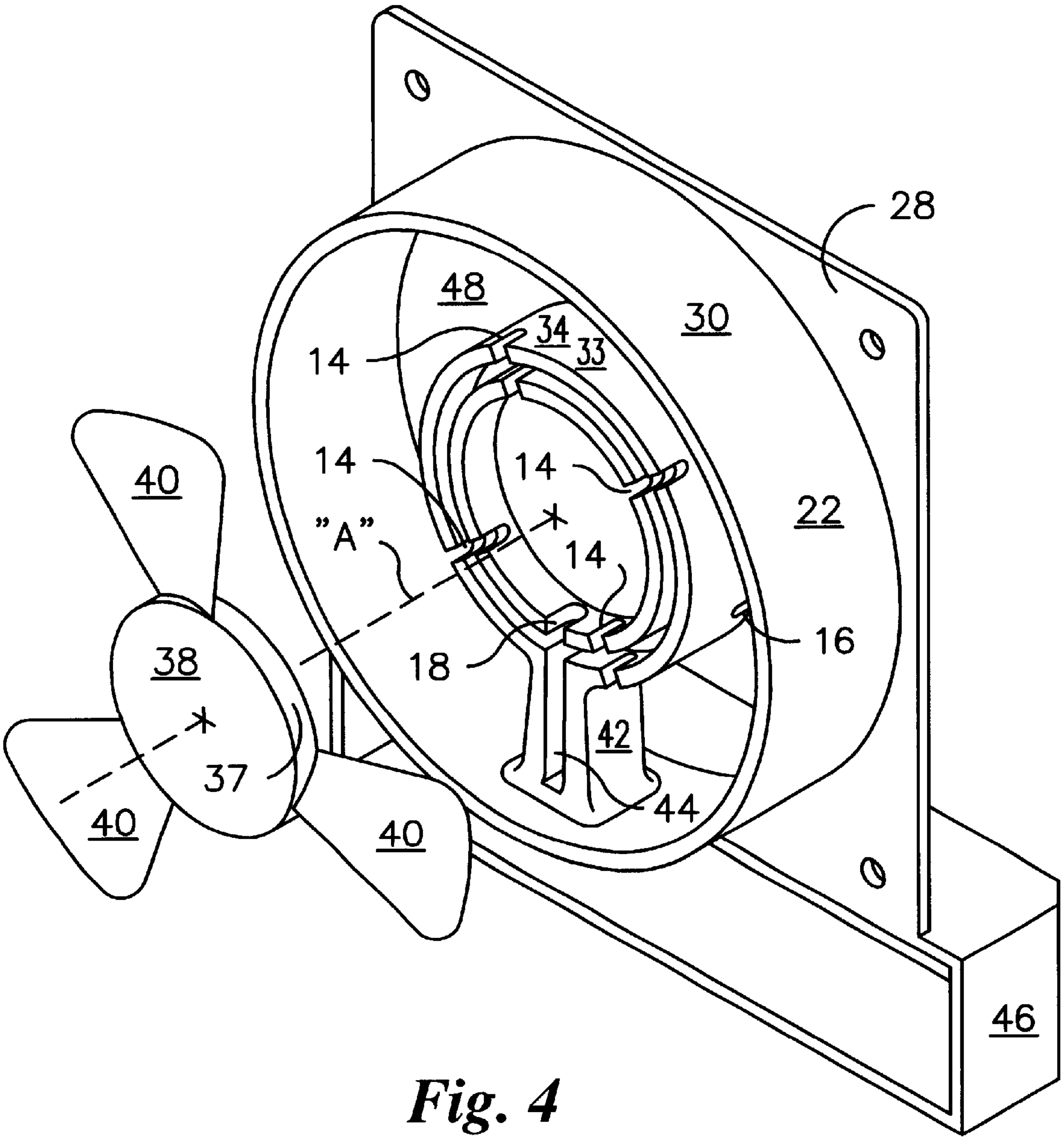
FIG. 4 is a rear perspective view of the annular ring of FIG. 2A mounted on a mounting plate for generally centrally aligning the emitter assembly with a fan.

The emitter assembly 10 of the present invention is preferably, but not necessarily, used as part of an ion air blower 118 and is preferably contained inside of an ion air blower housing 120. Referring to FIG. 4, also enclosed in the ion air blower housing 120 is a fan 39 that is used to force or draw air over the ionizing pins 32. The fan 39 has a separate housing, or mounting unit, (not shown) that is secured within the ion air blower housing 120. The fan 39 is preferably, but not necessarily mounted so that the center of the fan hub 38 is axially aligned with a generally central position within the emitter assembly 10 as shown by the alignment axis "A." The specific type of fan 39 used with the emitter assembly 10 is not critical to the present invention and, accordingly, further details regarding the fan 39 are neither recited nor necessary. While the emitter assembly 34 is described as being attached to a mounting plate 28 (further described below) for purposes of positioning the emitter assembly 10 within a specific type of ion air blower, the emitter assembly 10 of the present invention is independent from the specific mounting plate 28 described herein and can be used in a variety of applications or types of ion air blowers.

Figure 2A:
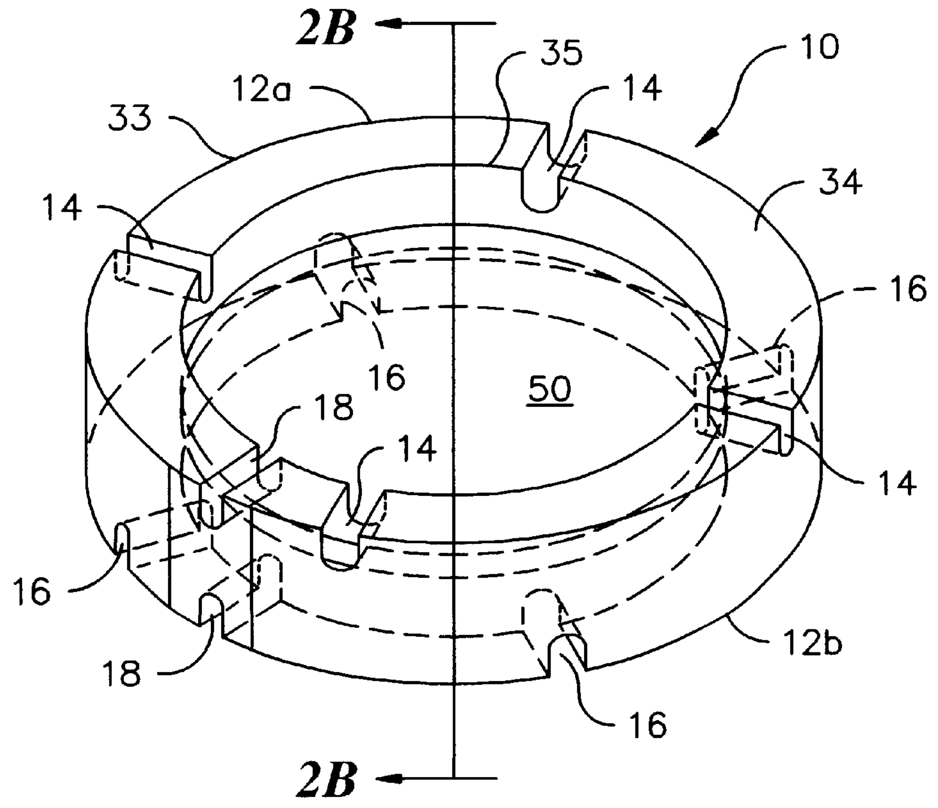
FIG. 2A is a perspective view of an annular assembly ring of the emitter assembly according to the preferred embodiment of the present invention.
Figure 2B:
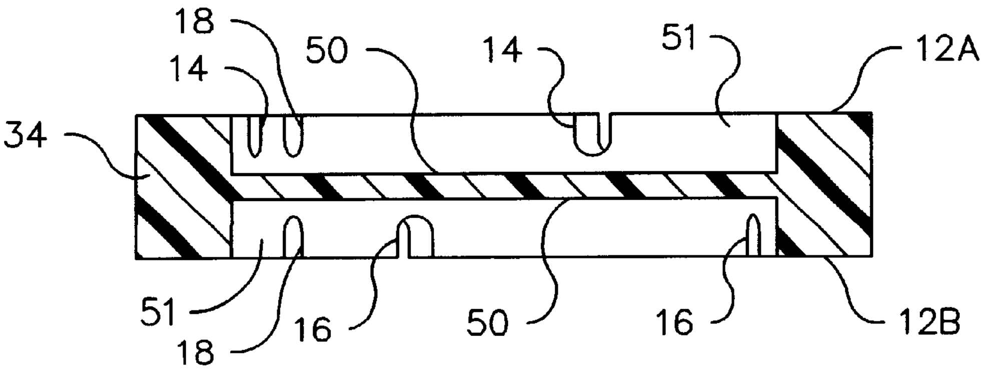
FIG. 2B is a cross-sectional view of the annular assembly ring of FIG. 2A as taken along the line 2B—2B of FIG. 2A.

Referring to FIGS. 2A and 2B, the annular assembly ring 34 has a generally cylindrical shape having first and second major surfaces 12A, 12B on opposite ends of the annular assembly ring 34. The annular assembly ring 34 has hollows 51 formed in each end. A center portion 50 of the assembly ring 34, which is generally parallel to each of the first and second major surfaces 12A, 12B, separates the hollows 51. Each of the hollows 51 preferably has a generally cylindrical shape.

The first major surface 12A has a first set of socket grooves 14 placed therein for supporting ionizing pin sockets 14 (shown in FIG. 3). Each of the first set of socket grooves 14 preferably, but not necessarily, has a cross-sectional area that is generally U-shaped. The present invention encompasses a first set of socket grooves 14 having a cross-sectional area that is rectangular, triangular, polygonal or the like. It is preferable that the first set of socket grooves 14 comprises four grooves spaced generally equidistantly along the first major surface 12A. However, the present invention includes using two (2), six (6), seven (7) or more grooves 14 along the first major surface 12A.

The second major surface 12B preferably, but not necessarily, has a second set of socket grooves 16 spaced generally equidistantly along the second major surface 12B. The present invention includes a second set of socket grooves 16 having two (2), six (6) or more grooves positioned along the second major surface 12B. It is preferred, but not necessary, that the second set of socket grooves 16 are offset from the first set of socket grooves 14 so that all of the ionizing pins 32 extend generally outwardly from the annular assembly ring 34 and are spaced generally equidistantly about the annular assembly ring 34. The present invention includes the use of socket grooves 14, 16 that are not equidistantly positioned about the annular assembly ring 34. The shape of the second set of socket grooves 16 is preferably the same as that of the first set of socket grooves 14. Each of the socket grooves 14, 16 preferably extend from the outer surface 33 of the annular assembly ring 34 through to the inner surface 35 of the respective hollow 51.

It is preferable, but not necessary, that one conduit groove 18 extend along each of the first and second major surfaces 12A, 12B of the annular assembly ring 34. It is preferable that the conduit grooves 18 are generally vertically aligned (when viewed in FIG. 2A) with the conduit grooves 18 positioned one over the other. The conduit grooves 18 are used to allow power conduits 24 to traverse the annular assembly ring 34.

While it is preferable that the annular assembly ring 34 have a generally circular shape when viewed generally perpendicular to either the first or second major surface 12A, 12B, those of ordinary skill in the art will appreciate that the shape of the assembly 34 can be varied without departing from the scope of the present invention. For example, the assembly 34 can have a generally rectangular, triangular, polygonal shape or the like without departing from the scope of the present invention. However, as will become clearer below, the generally circular shape of the annular assembly ring 34 is ideal for use with fans 39 having a generally circular hub 38.

Figure 5:
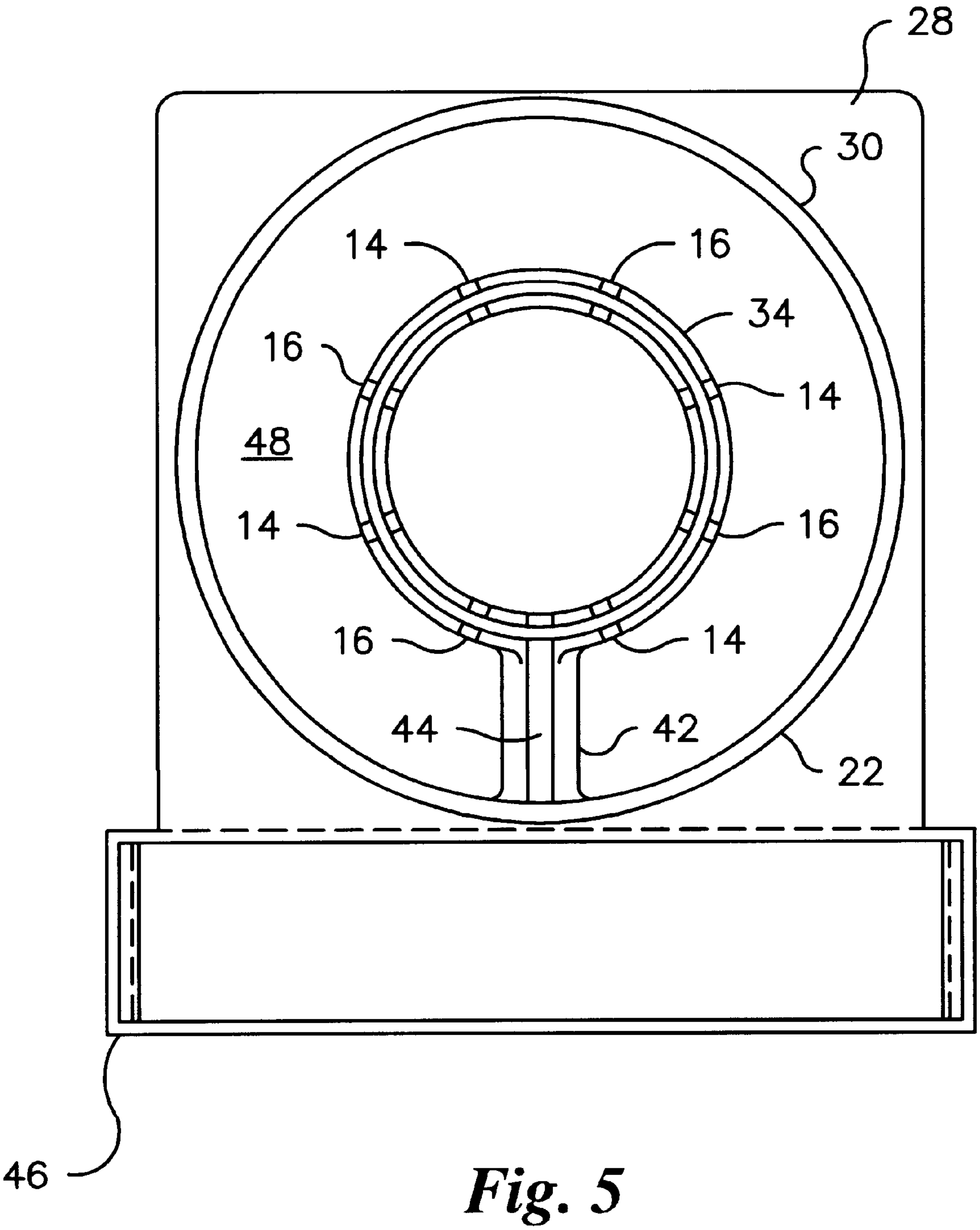
FIG. 5 is a rear elevation view of the annular ring and the mounting plate of FIG. 4.
Figure 6:
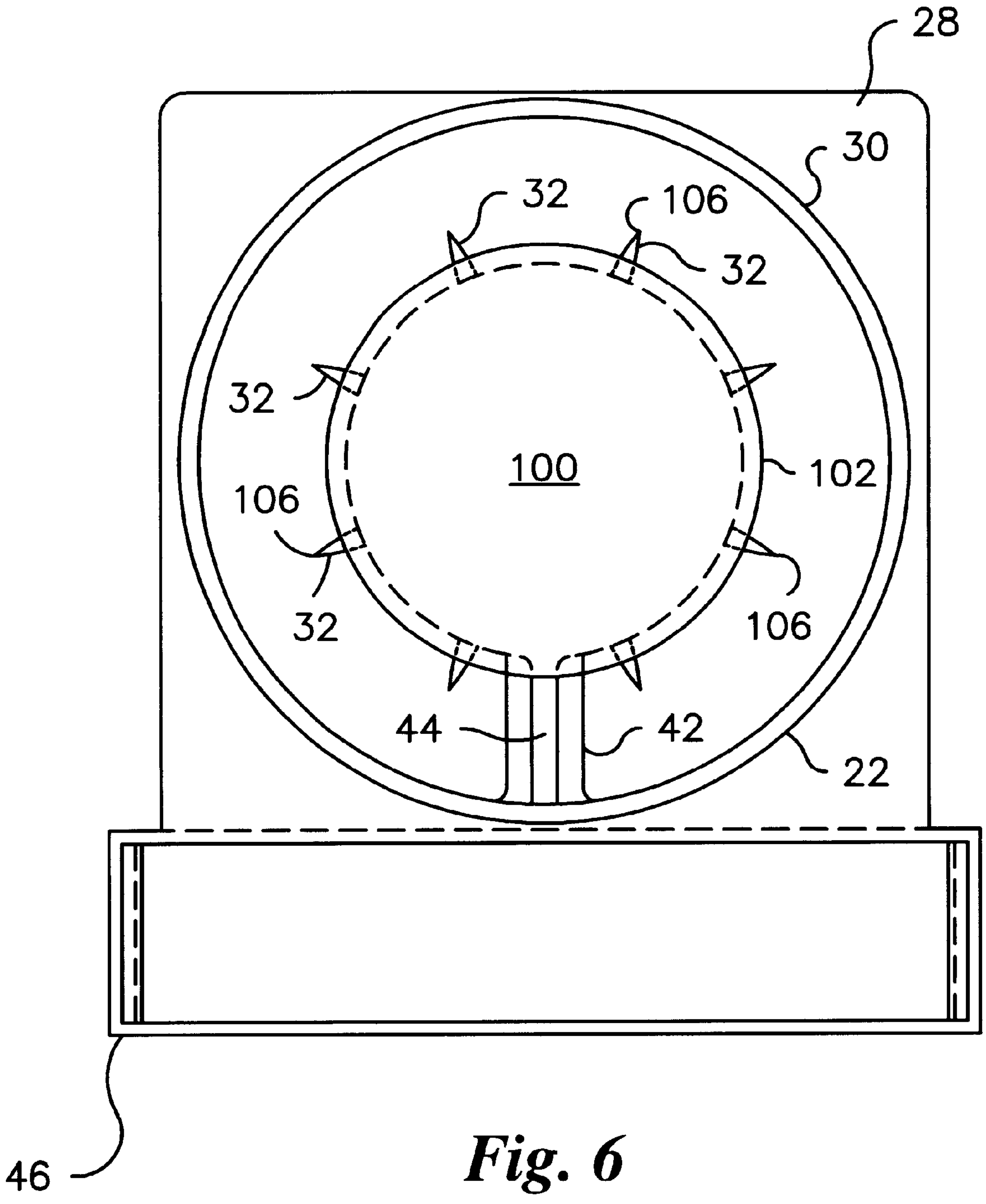
FIG. 6 is a rear elevation view of the emitter assembly of FIG. 3 modified to include an embodiment with an air baffle and the present invention.
Figure 7:
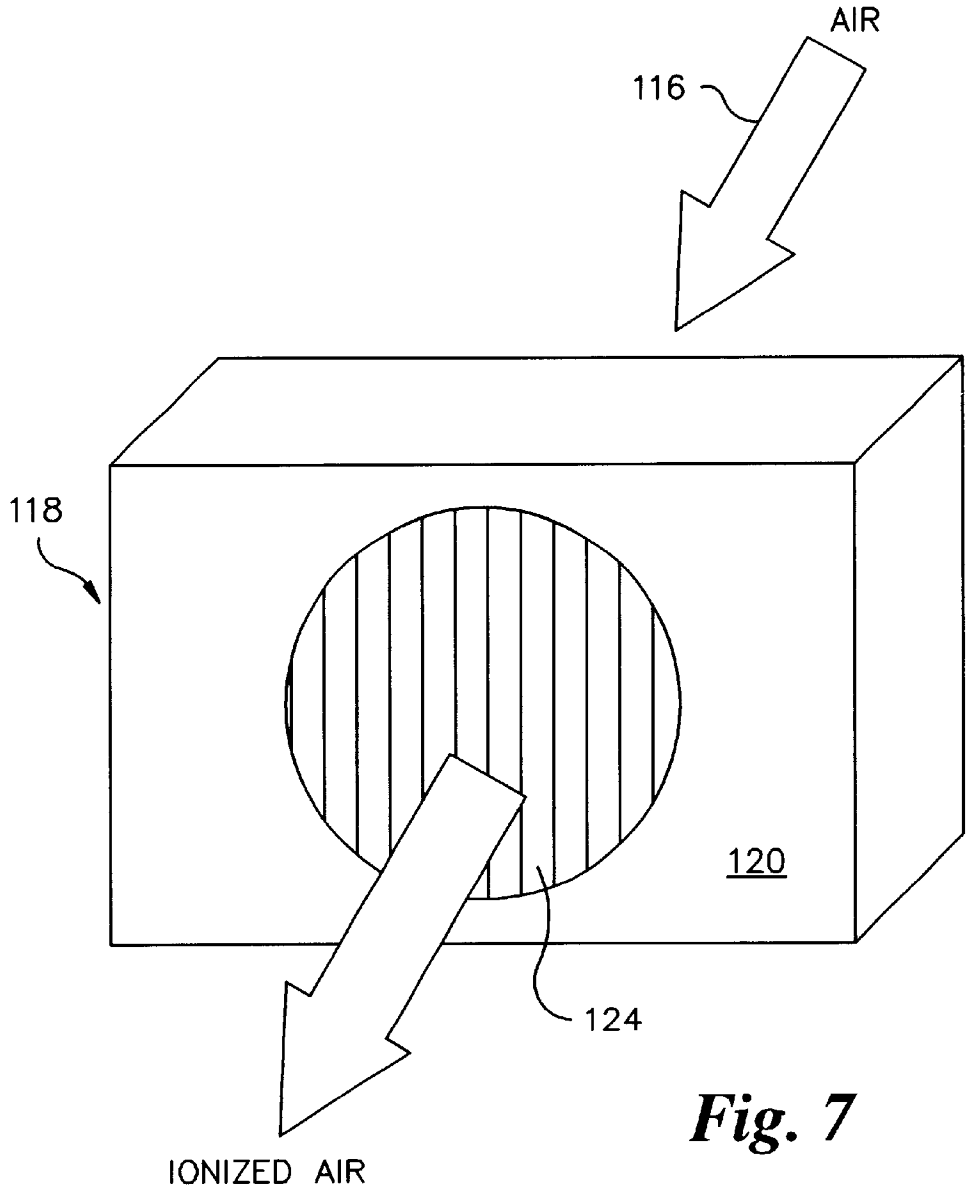
FIG. 7 is a perspective view of an ion air blower which might include the present invention.
Figure 8:
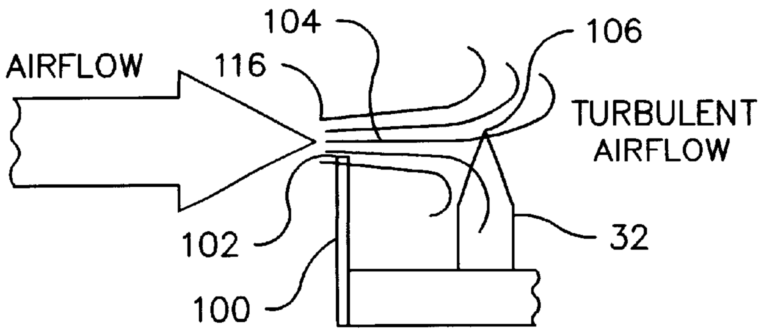
FIG. 8 is a partial side elevation view of the air baffle of FIG. 6 illustrating how the proper placement of the air baffle generates turbulent airflow proximate to a tip of an ionizing pin.

Referring briefly to FIG. 3, the ionizing pins 32 extend generally radially outwardly from the annular ring assembly 34. Referring to FIGS. 4 and 5, the annular assembly ring 34 is preferably mounted in the ion air blower housing using a generally rectangular-shaped mounting plate 28. The mounting plate 28 preferably has a generally circular cutout 48 through which air is transported through the ion air blower. Extending generally rearwardly along the perimeter of the generally circular cutout 48 is an air guide 30. The air guide 30 preferably has a generally cylindrical tubular shape which forms an annular ring 22. The present invention includes air guides 30 having other shapes and geometries.

A stem 42 preferably extends generally radially inwardly from an inner surface of the air guide 30 to support the annular assembly ring 34 in position aligned generally centrally relative to the circular cutout 48. Thus, the annular assembly ring 34 of the emitter assembly 10 is preferably positioned generally concentrically within the air tube 30. The stem 42 preferably has a generally trapezoidal shape and extends from an inner surface of the air guide 30 generally radially inwardly to connect to an outer surface 33 of the annular assembly ring 34. The stem 42 preferably has a pair of conduit slots 44 extending generally vertically along the stem 42. The conduit slots 44 preferably have a generally rectangular shape for receiving power conduits 24. The conduit slots 44 are preferably aligned with the conduit grooves 18 in the annular assembly ring 34 to provide a channel for power conduits 24 to extend through to an electrical connector(s) 20 (further described below) disposed within the emitter assembly 10.

While the annular assembly ring 34, the stem 42, the air guide 30 and the mounting plate 42 are referred to as separate components above, the present invention includes the various components being integrally formed using injection molding or the like. The present invention encompasses the various components being formed of a single material or being formed of separate materials when the various components are individually assembled. It is preferable, but not necessary, that a compartment 46 be formed along the lower edge of the mounting plate 28. The compartment 46 is preferably for housing the voltage power supply (not shown).

It is preferable that the air guide 30 has an inner diameter approximately equal to the diameter of the area swept out by the fan blades 40 of the fan 39. This results in the most efficient transfer of air through the air guide 30. It is also preferable, but not necessary, that the annular assembly ring 34 be sized so that the outer surface 33 of the annular assembly ring 34 is generally aligned with the outer edge 37 of the fan hub 38. Thus, the entire area swept out by the fan blades 40 for propelling air through the air chute 30 is generally equal to the area between the inner surface of the air guide 30 and the outer surface 33 of the annular assembly ring 34.

As best shown in FIG. 3, the wiring of the emitter assembly 10 is accomplished using sockets 36 that are directly attached to an electrical connector 20 that is contained within the annular assembly ring 34. This wiring structure is much simpler than that of the prior art (shown in FIG. 1) and allows the housing of the ion air blower to be miniaturized to the same general size as that of the fan housing (not shown). The spacing between the air guide 30 and the emitter assembly 10 is preferably sufficient to prevent arcing between the wiring and ionizing pins 32 of the emitter assembly 10 and the ion air blower housing 120.

It is preferable, but not necessary, that two electrical connectors 20 are positioned within the annular assembly ring 34. Each electrical connector is preferably positioned on the central portion 50 of the annular assembly ring 34 that forms a bottom of each hollow 51. Each electrical connector 20 preferably has sockets 36 directly attached for receiving ionizing pins 32. The electrical connector 20 receives power through the power conduits 24 and transfers the power to the ionizing pins 32, via the sockets 36, to produce ions (not shown). As the sockets 36 are preferably generally rigidly attached to the electrical connector 20, the electrical connectors 20 are easily inserted in the hollows 51 by aligning the sockets 36 with a set of socket grooves 14, 16.

Each socket 36 preferably receives an ionizing pin 32 which extends generally radially outwardly therefrom. As mentioned above, the power conduits 24 extend through the conduit grooves 18 to supply power to the ionizing pins 32 via the electrical connector 20. The second electrical connector 20 is preferably positioned on the opposite side of the central portion 50 of the annular assembly ring 34 in the remaining hollow 51. The second electrical connector 20 is similarly connected to ionizing pins 32 using sockets 36 that are directly attached to the second electrical connector 20.

It is preferable, but not necessary, to use two separate electrical connectors 20 when operating the emitter assembly 10 using DC voltage. The use of two electrical connectors 20 allows one set of pins 32 to be operated at a negative voltage and a second set of pins to be operated at a positive voltage. This is necessary to generate both positive and negative ions (not shown) on the tips of the ionizing pins 32. Alternatively, AC voltage can be used with both electrical connectors 20 to cause all of the ionizing pins 32 to alternately emit positive and negative ions (not shown). The present invention includes the use of a single electrical connector 20 in conjunction with AC power to generate both positive and negative ions (not shown).

It is preferred that the sockets are held in their respective grooves 14, 16 by placing a circular plate (not shown) over each end of the annular assembly ring 34 and fixing the plates thereto. Once the plates (not shown) are in position, the sockets 36 are firmly held in position. The present invention includes other methods of securing the sockets 36 in their respective grooves, such as sealing each socket in place with additional ABS material, epoxy, or the like.

The electrical connectors 20 with attached sockets 36 can be separately manufactured from the annular assembly ring 34 and are easily assembled with the annular assembly ring 34 to simplify manufacturing. Thus, the preferred embodiment of the present invention can be readily assembled and positions all of the wiring inside of the annular assembly ring 34 to facilitate the miniaturization of an ion air blower 118.

Alternatively, the electrical connector(s) 20 can be manufactured on a nonconductive sheet of material (not shown) which is inserted into the annular assembly ring 34 to create an interference friction fit. The present invention also includes using generally rigid conductive wiring to attach the electrical connectors 20 to the sockets 36.

Referring to FIGS. 2A–5, the emitter assembly 10 of the present invention operates as follows. An emitter assembly 10 is positioned inside an ion air blower 118 via a mounting plate 28. The preferably generally rectangular shaped mounting plate 28 is secured inside the housing 120 and has a generally circular cutout 48 therein. Extending generally rearwardly around the perimeter of the generally circular cutout 48 is an air guide 30. The air guide 30 preferably has a generally cylindrical tubular shape. A fan 39 is positioned adjacent to the air guide 30 to drive or draw air through the air guide 30.

A stem 42 extends generally radially inwardly from an inner surface of the air guide 30 to support the annular assembly ring 34 in a position that is generally centrally aligned with the circular cutout 48. The sizing of the outer surface 33 of the annular assembly ring 34 is preferably generally equal to that of the hub 38 of the fan 39. Ionizing pins 32 extend from the outer surface 33 of the annular assembly ring 34 with the ionizing pin tips 31 positioned in the air guide 30 proximate to the point of fastest airflow generated by the fan blades 40. This facilitates the stripping of ions (not shown) from the ends of the ionizing pins 32 by the propelled or drawn air.

Each of the ionizing pins 32 is secured within a socket 36 that is located in one of the first or second set of socket grooves 14, 16. Each socket 14 is preferably supported by its respective groove 14, 16 and is directly attached to an electrical connector 20 that is generally centrally positioned within the emitter assembly 10. Power is supplied to the electrical connector 20 via power conduit(s) 24 and is then transmitted via the sockets 36 to the individual ionizing pins 32. The voltage supplied to the pins causes corona onset to occur and ions are generated on the tips of the ionizing pins 32. Air is driven or drawn by the fan 39 over the ionizing pins 32 facilitating the transfer of ions into the air. The preferably balanced positive and negative ions (not shown) are then ejected by the ion air blower 118 to prevent the build up of charge in a given area or clean room (not shown).

Preferably, a sensor (not shown) is positioned in the ion air blower 118 adjacent to the emitter assembly 10 on a side opposite from the fan 39 to detect the level of ions (not shown) in the air. A feedback circuit (not shown) is preferably used to automatically adjust the power transmitted to the ionizing pins 32 to adjust the level of ions (not shown) contained in the air being ejected from the ion air blower 118.

The emitter assembly 10 of the present invention allows for any housing 120 of the ion air blower 118 to be reduced in size to that of the housing of the fan 39 while eliminating any arcing between the ionizing pins 32 or wiring 26 and the outer housing of the ion air blower 118. Additionally, the emitter assembly 10 of the present invention preferably positions the tips 31 of the ionizing pins 32 in the fastest portion of the flow of air 116 in the air guide 30. Additionally, when two electrical connectors 20 are being used to supply power to alternate sets of ionizing pins 32, the electrical connectors 20 preferably form a capacitor (not shown) that reduces the noise of the emitter assembly 10. Additionally, the ease of manufacturing of the emitter assembly 10 is considerably increased relative to that of the prior art (shown in FIG. 1).

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. An emitter assembly comprising:

(a) a support structure; and (b) at least one ionizing pin supported by and extending radially outward, with respect to the geometric center of the support structure, from the support structure, wherein the at least one pin is used to generate at least one of either positive or negative ions for neutralizing charge in a workspace.

2. The emitter assembly of claim 1 further comprising:

(c) at least one electrical connector for powering the ionizing pins disposed in the support structure that has sockets directly attached for receiving the ionizing pins and that is supplied power via power conduits.

3. The emitter assembly of claim 2 wherein there are two electrical connectors used in conjunction with DC voltage that allows one set of pins to be operated at a positive voltage and a second set of pins to be operated at a negative voltage for generating positive and negative ions.

4. The emitter assembly of claim 3 wherein the two electrical connectors used to supply power to alternate sets of ionizing pins form a capacitor that reduces the noise of the emitter assembly.

5. The emitter assembly of claim 2 wherein there is a single electrical connector used in conjunction with AC voltage for generating both positive and negative ions.

6. The emitter assembly of claim 2, wherein the electrical connector is a printed circuit board assembly.

7. The emitter assembly of claim 1 wherein there is a plurality of ionizing pins about the support structure.

8. The emitter assembly of claim 1 wherein the support structure has a generally cylindrical shape.

9. The emitter assembly of claim 1 wherein the support structure is formed of a molded material.

10. The emitter assembly of claim 1 wherein the ionizing pins are formed of machined tungsten.

11. An ion air blower comprising:

(a) an emitter assembly including:

(i) a support structure; and (ii) at least one ionizing pin supported by and extending radially outward, with respect to the geometric center of the support structure, from the support structure; and (b) a housing that guides a flow of air.

12. The ion air blower of claim 11 further comprising:

(c) a fan located downstream from the emitter assembly, relative to the flow of air through the ion air blower.

13. The ion air blower of claim 11 further comprising:

a fan located upstream from the emitter assembly, relative to the flow of air through the ion air blower.

14. The emitter assembly of claim 1 wherein the support structure is an annular assembly ring.

15. The ion air blower of claim 11 wherein the support structure is an annular assembly ring.

16. An ion air blower comprising:

(a) an emitter assembly comprising:

(i) a support structure;

(ii) at least a first ionizing pin in a first plane, the first ionizing pin being supported by and extending from the support structure, wherein the first ionizing pin is used to generate at least one of either positive or negative ions for neutralizing charge in a workspace; and (iii) at least a second ionizing pin in a second plane that is substantially parallel to the first plane, the second ionizing pin being supported by and extending from the support structure, wherein the second ionizing pin is used to generate the other of either positive or negative ions for neutralizing charge in a workspace;

(b) a housing that guides a flow of air; and (c) a fan.

17. The ion air blower of claim 16, wherein the first ionizing pin generates positive ions and the second ionizing pin generates negative ions.

18. The ion air blower of claim 16, wherein the first plane is closer to the fan than the second plane.

19. The ion air blower of claim 16, wherein the support structure is an annular assembly ring.

20. The ion air blower of claim 16, wherein there is a plurality of pins about the support structure.

21. The ion air blower of claim 16, wherein the ionizing pins extend radially outward from the support structure.

* * * * *